US009483115B2

(12) United States Patent
Irmler et al.

(10) Patent No.: US 9,483,115 B2
(45) Date of Patent: Nov. 1, 2016

(54) TRIGGERING CONTROL OF AUDIO FOR WALK-AROUND CHARACTERS

(71) Applicant: Disney Enterprises, Inc., Burbank, CA (US)

(72) Inventors: Holger Irmler, Los Angeles, CA (US); Brent David Strong, Burbank, CA (US); Asa K. Kalama, Glendale, CA (US); Raymond J. Scanlon, Burbank, CA (US); Cory Joseph Rouse, Los Angeles, CA (US); Renee M. Johnson, North Hollywood, CA (US); Tina Y. Shioji, Long Beach, CA (US); Abigail F. Tamayo, Walnut, CA (US); David Frederick Beaudry, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 724 days.

(21) Appl. No.: 13/906,555

(22) Filed: May 31, 2013

(65) Prior Publication Data
US 2014/0358263 A1  Dec. 4, 2014

(51) Int. Cl.
*G06F 17/00* (2006.01)
*G06F 3/01* (2006.01)

(52) U.S. Cl.
CPC ............ *G06F 3/014* (2013.01); *G06F 3/013* (2013.01)

(58) Field of Classification Search
CPC ....... G06F 3/013; G06F 3/014; A63H 30/00; G01C 21/3608; G10L 13/00; G10L 13/027
See application file for complete search history.

(56) References Cited

U.S. PATENT DOCUMENTS

| | | | | |
|---|---|---|---|---|
| 6,631,351 B1 * | 10/2003 | Ramachandran | ....... | G10L 13/00 704/10 |
| 7,862,522 B1 * | 1/2011 | Barclay | ............... | A61B 5/6806 414/2 |
| 2007/0169615 A1 * | 7/2007 | Chidlaw | ............. | G10H 1/0091 84/723 |
| 2008/0139082 A1 * | 6/2008 | Schnuckle | ............... | A63H 3/38 446/392 |
| 2010/0110368 A1 * | 5/2010 | Chaum | ............... | G02B 27/017 351/158 |
| 2010/0144239 A1 * | 6/2010 | Eck | ........................ | A63H 13/00 446/330 |
| 2014/0240217 A1 * | 8/2014 | Lorenceau | .............. | G06F 3/013 345/156 |

* cited by examiner

*Primary Examiner* — Fan Tsang
*Assistant Examiner* — Eugene Zhao
(74) *Attorney, Agent, or Firm* — Marsh Fischmann & Breyfogle LLP; Kent A. Lembke

(57) ABSTRACT

A control system for selectively operating a sound system provided in a walk-around character costume. e.g., to play audio files in an order defined by a dialog tree that can be navigated by a performer wearing the costume. The control system includes a trigger mechanism provided in the costume operable by a performer wearing the costume to generate and transmit at least one trigger signal to navigate through a dialog tree. A controller receives the trigger signal and transmits a control signal causing the sound system to playback pre-recorded dialog. The system includes a trigger processing module run by the controller for processing the trigger signal and, in response to such processing, for navigating pre-recorded audio for a show to select the set of pre-recorded dialog. The trigger mechanism includes a first and a second pressure sensor in a thumb and index finger of a glove of the costume.

25 Claims, 6 Drawing Sheets

TRIGGERING CONTROL OF AUDIO FOR WALK-AROUND CHARACTERS

BACKGROUND

1. Field of the Description

The present invention relates, in general, to walk-around, costumed characters and control over audio output (e.g., a character may sing or talk) on or by such walk-around characters, and, more particularly, to methods and systems for allowing a performer or operator wearing a walk-around character costume to selectively navigate a dialog tree or scripted audio playback and, in some cases, for allowing the pre-recorded audio provided by the dialog tree to be customized to suit a particular context (e.g., to provide context modulation) such as to suit individual characteristics of one or more people nearby the walk-around, costumed character (e.g., to provide audio suited to a young person or to a person having a birthday or celebrating another occasion).

2. Relevant Background

Walk-around or costumed characters are used to entertain and interact with visitors of many facilities including theme or amusement parks. A walk-around character may be provided by an operator or performer wearing a costume including a head that covers the performer's face. The costume head is mounted to or supported on a headband that is worn by the performer. In the head and/or costume, equipment including sound equipment (e.g., a speaker for playing pre-recorded audio) and robotics is provided so that a walk-around character can speak with visitors by playing back pre-recorded, scripted lines of conversation to provide a meetable character that can be animated to move their eyes and mouth while they talk and interact with the visitors.

In many applications, the walk-around character is representing a character from a movie, a video game, a cartoon, or the like. The visitors expect that character to have a particular or a single voice, e.g., the voice used in the movie. As a result, the performer cannot simply use their own voice when they meet and talk with visitors, and, instead, scripted lines typically are recorded for each of the walk-around characters to provide the expected voices. The onboard audio or sound equipment is then controlled or triggered to playback these lines at appropriate times. The character's head may simultaneously be animated by operating robotics to provide mouth movement and eye blinks that are synchronized to the audio playback.

To allow each walk-around character to speak to visitors, there has to be an effective way to trigger the audio that cannot be detected by the often nearby visitor. For example, the triggering mechanism should not be audible to the visitor. One implementation is to use a backstage operator who has control over the audio and animation by selectively sending wireless control signals to the costume's sound system. However, it is not practical in many cases to provide a backstage operator for each walk-around character. In other implementations, control is provided to the performer within the costume using finger paddles that the performer can operate to lip sync the character mouth to the pre-recorded audio track presently being played back to the visitor. Use of finger paddles, though, is typically visible to the visitors, which can min the illusion or desired effect.

There remains a need for effective ways to trigger control over walk-around character equipment such as to trigger an audio playback and to trigger animation of the character's mouth (or to trigger other character-based operation or special effects). Preferably, such new ways would not be audible and would not be detectable by an observer of the character. Further, it may be desirable that the trigger be easy for the performer to initiate or operate while also providing relatively few false triggers as interaction with a walk-around character can be ineffective if the character speaks at improper moments or an incorrect scripted line is triggered.

SUMMARY

The following description provides a walk-around character control assembly or system with enhanced control functionality to provide a performer of a walk-around character (e.g., a character from a movie) the ability to silently and non-visibly trigger audio, animation, and/or special effects. The character control assembly can allow the operator (or performer) wearing a walk-around costume to trigger audio playback and to trigger animation of the character's mouth (or to trigger other character-based operation or special effects) without the use of finger paddles or an additional backstage operator.

When a "trigger" or triggering action is sensed by the control assembly, the response often will be to navigate within a dialog tree to initiate a particular set of pre-recorded audio to be played back via the sound system provided within the walk-around costume (e.g., a speaker within the character head may greet a visitor with "Hello" or, if later in the dialog tree or in a different scene within the dialog tree, with "Goodbye"). In some embodiments, the set of pre-recorded audio selected is context-specific and is selected by a context modulator based on input from an operator (e.g., a host, a photographer, or the like). For example, an operator of a context input device, such as a wireless communication device with a touchscreen providing an iconographic listing of available contexts, may observe a characteristic about a visitor or participant of a room/set in which the walk-around costumed character is performing and respond by selecting one of a number of context-related icons/input buttons on the input device. The context modulator receives this context input and uses it to retrieve a proper set of pre-recorded clips for a scene/show (e.g., to shift or bias the resulting conversation or interaction toward a particular visitor's characteristics such as a pre-teen girl wearing a princess outfit or a person celebrating their birthday).

More particularly, a control system is provided that is adapted for selectively operating a sound system provided in a walk-around character costume (e.g., to play audio files in an order defined by a dialog tree that can be navigated by a performer wearing the costume). The control system includes a trigger mechanism provided in the walk-around character costume, and the trigger mechanism is operable by a performer wearing the walk-around character costume to generate and transmit at least one trigger signal (e.g., when they want to navigate through (forward, backward, or scene jump) the dialog tree to a next line of dialog). The system also includes a controller receiving the trigger signal (e.g., a wireless signal) and, in response, generating and transmitting a control signal causing the sound system to playback a set of pre-recorded dialog (e.g., the trigger signal is processed to navigate to a particular set of dialog). Further, the system includes a trigger processing module run by the controller for processing the trigger signal and, in response to such processing, to navigate pre-recorded audio for a show to select the set of pre-recorded dialog.

In some embodiments, the trigger mechanism includes a first and a second pressure sensor spaced apart in the walk-around character costume. Then, the processing of the at least one trigger signal by the trigger processing module includes comparing a first pressure sensed by the first pressure sensor to a first threshold and comparing a second pressure sensed by the second pressure sensor to a second threshold. In such cases, the control signal is generated by the controller when the first and second thresholds are concurrently exceeded (not just when one is pressed so as to avoid false triggering). In such control systems, the first threshold may differ from the second threshold (and each pressure value may be tuned to suit a particular performer). Further, the first pressure sensor may be positioned in a glove of the walk-around character costume in a pad of the thumb of the glove, and, to allow the performer to easily trigger dialog tree navigation, the second pressure sensor is positioned in a finger of the glove (such as the outer surface of the index or fore finger of the glove).

In other embodiments of the control system, the trigger mechanism includes an eye tracking sensor. In such embodiments, the trigger signal(s) is processed by the trigger processing module to identify pupil movement of the performer exceeding a predefined threshold and/or to identify blinking of an eye by the performer such that navigation of the dialog tree may be based on the performer looking left, right, up, or down and/or the performer blinking (e.g., hold their eyes closed for more than a preset amount of time). The pupil movement may be processed so that it initiates the control signal when the identified pupil movement is outside of a normal pupil location range so as to avoid false triggers. The control signal may be initiated when the identified pupil movement is outside of the normal pupil location range at least twice within a preset time period, as this may also reduce false triggers by inadvertent eye movement.

In some cases, the trigger mechanism includes a gesture recognition sensor mounted on the walk-around character costume. The processing of the trigger signal by the trigger processing module may involve identifying a gesture. Then, the performing of the navigating of the pre-recorded audio for the show may be based on the identified gesture and also based on when the identified gesture is received during performance of the show (e.g., a single gesture may initiate differing dialog depending upon when it is performed during a show such as a hand wave initiating a greeting during an early scene of a show but initiating a farewell during a later or final scene).

Further, in some embodiments, the control system may include a context modulator receiving a context selection signal. Then, in response, the context modulator acts to select at least a portion of the pre-recorded audio for the show based on the context selection signal (or causes the controller to do so), whereby the set of pre-recorded dialog is context-specific. In such an embodiment, the context selection signal may be generated by a context input device operable to display an iconographic list of context icons (such as in a graphical user interface (GUI) on a touchscreen) for selection by an operator of the context input device. In many cases, the context input device is positioned or used in a room or on a set where the performer wearing the walk-around character costume performs a show or interacts with one or more visitors.

DETAILED DESCRIPTION

Figure 1:
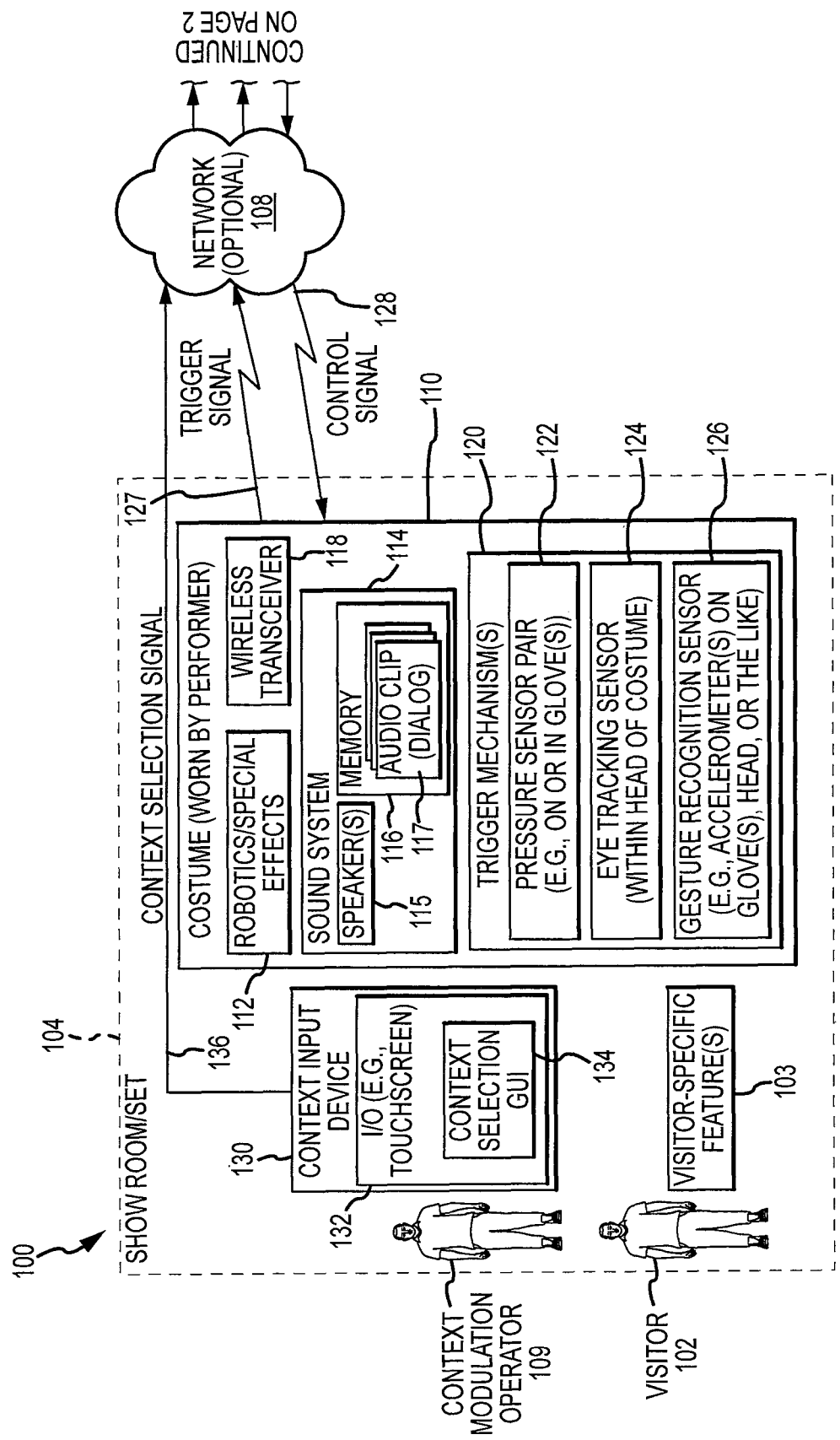
FIG. 1 is a functional block drawing of a walk-around character control system or assembly with trigger mechanisms and context modulation to facilitate control or navigation of audio playback and/or animation of costume components such as lip and eye movements.
Figure 1:
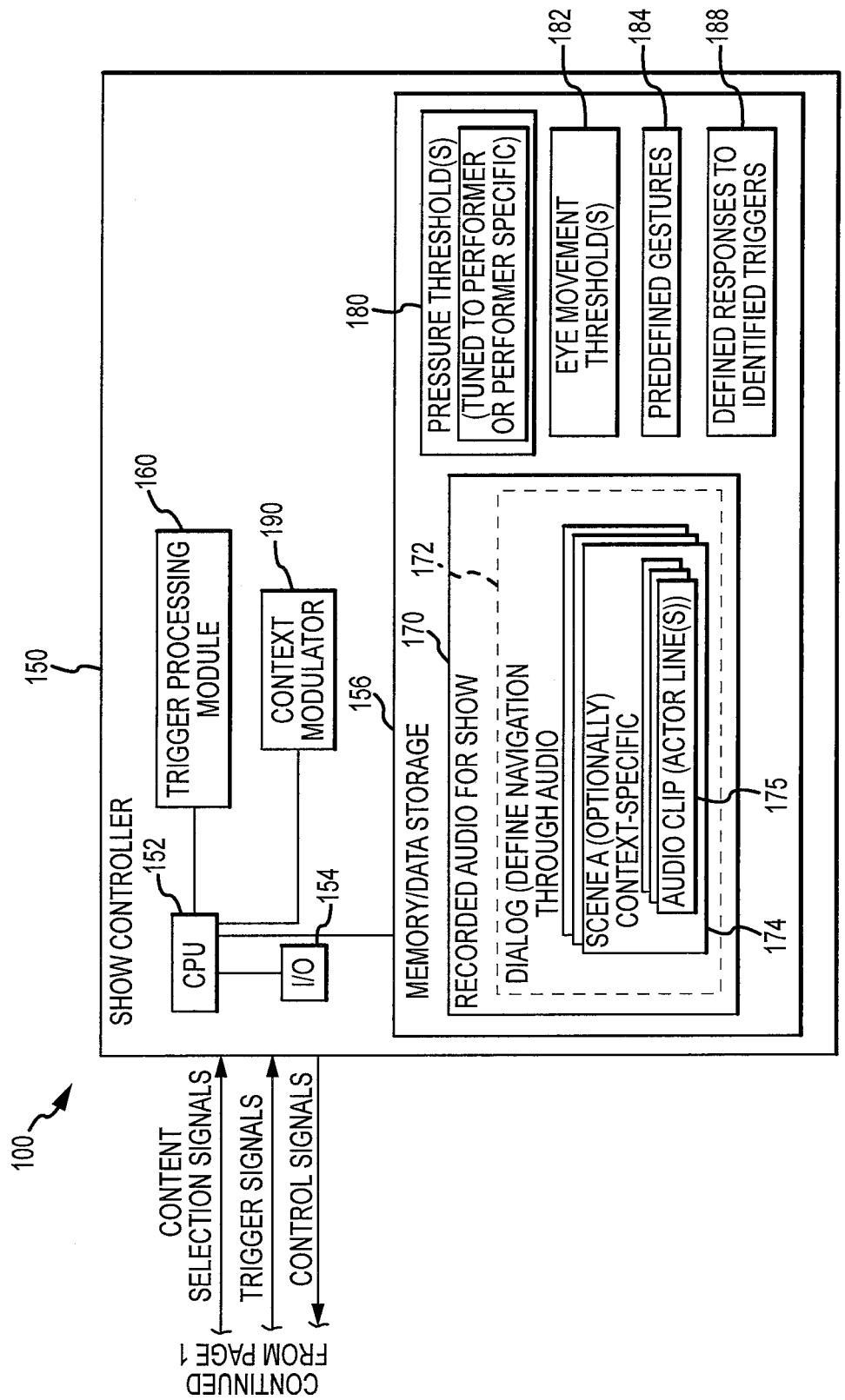

Briefly, the present description is directed toward methods and systems for controlling a walk-around, costumed character to allow the operator or performer (wearer of the costume) to better operate the sound system or special effects/robotics of the costume to interact with visitors or observers. The character control systems typically will include one or more trigger mechanisms or assemblies for allowing a wearer ("performer") of a character costume to be able to trigger costume output such as audio playback or animation of the character's eyes, mouth, ears, and the like with onboard robotics. Such performer control typically will sense an affirmative action or movement of the performer, and, in response, a trigger (or sensor signal) processing module (or processor) will cause a controller to generate and transmit control signals (control is triggered) to the sound and/or animation components of the costume.

In the control assembly, a variety of trigger mechanisms or assemblies may be provided to facilitate operator or performer-based control over dialog tree navigation or triggering robotics or other special effects. In some control assemblies, the trigger mechanism includes a pair of analog pressure sensors or switches, which are linked to a trigger processing module of a controller (within the character and/or offboard (or remote/backstage) and connected via a wireless communication network), that allow a performer to navigate through scenes of a show via a dialog tree associated with the present scene without the triggering actions (pressing of the two sensors together by the performer) being visible to visitors/observers.

The use of two spaced apart sensors/switches also limits false triggering (e.g., during handshakes or "high fives" between visitors/observers and the walk-around, costumed characters), and, in some cases, both sensors have to be properly triggered/activated (such as with sensed pressure over a threshold level) to initiate a trigger (movement within a dialog tree). In some implementations, two pressure sensors are mounted on the thumb and index finger on the inside or non-exterior surfaces of the character or costume glove. The performer wearing the glove (or gloves if sensors are provided in both gloves) is able to navigate through a dialog tree associate with a scene by pressing their two fingers and associated pressure sensors together. For example, a left hand trigger may be used to move the dialog forward within the dialog tree (or to a next scene and associated dialog tree) while a right hand trigger may be used to move the dialog backwards within the dialog tree (or to a previous scene and dialog tree).

In the same or differing control assemblies, the trigger mechanism includes an eye tracking sensor provided on the costume (e.g., within the character head). The eye tracking sensors are linked to a trigger processing module of a controller (within the character and/or offboard (or remote/backstage) and connected via a wireless communication network). Tracking movement of the performer's eyes allows a performer to navigate through scenes of a show via a dialog tree associated with the present scene without the triggering actions (predefined eye movements) being visible to visitors/observers as their eyes are hidden behind the character's eyes provided by the costume head.

For example, the eye tracking sensor may be used to detect where the performer is looking at a particular point within a scene and, in some cases, whether their eyes are open or closed. Hence, eye movement such as to the left or right or blinking may be used by the performer to navigate through a dialog tree or a script of a scene. For example, the trigger processing module may determine from data from the eye tracking sensor that the performer is presently looking to the left, and the controller may use this information as a trigger such as to navigate forward (or backward) in a dialog tree (or move to a next (or prior) scene). The opposite navigation may be triggered by looking to the right. In other cases, two or more eye movements or eye-based actions may be used to trigger navigation through a dialog tree or to trigger a special effect. In some cases, the controller may respond to the determination by the trigger processing module that the performer has both looked up and then blinked (or any other combination of two or more eye-based activities) to trigger audio, animation, or special effects. The eye tracking sensor may be a camera directed toward and/or focusing on the performer's eye(s) while other implementations may use electrooculography (e.g., measuring the polarity of the performer's eyeball with sensors integrated into the costume head band of the character head or the like).

The trigger mechanism may instead take the form of a gesture recognition assembly that allows the performer to navigate through a dialog tree with a natural gesture. For example, the performer may be able to stretch out their arms (or make a similar gesture), and this gesture may be detected or recognized to cause a controller to jump to an absolute scene (e.g., a "asking for a hug" scene). In addition, the performer may be able to use gestures to trigger soundboard cues simply by performing a predefined gesture while in or performing a particular scene. For example, the performer may move their hand to wave to a visitor, and the controller may determine how to react to this gesture (recognized by the trigger processing module) within a scene such as by triggering a first audio track (e.g., "Hello") when in a first scene (e.g., a welcome or greet scene) and by triggering a second, different audio track (e.g., "Goodbye") when in a second scene (e.g., a closing or exit scene). In this way, a single type of gesture can trigger navigation in a dialog tree that differs depending upon the present scene (or context).

In one embodiment, the gesture recognition assembly includes one or more accelerometers that are positioned on the character's costume such as on one or both gloves (e.g., to detect waving or other hand movements/gestures), inside the costume head (e.g., to detect nodding, head shaking, or other head gestures), or other costume-based location. The trigger processing module (or gesture recognition processor (software/hardware)) is configured to process signals from the accelerometer to detect different gestures, which are typically natural gestures or gestures accepted as normal or expected for the character to perform during a scene, of the performer. Then, the controller may determine the current scene and/or an existing state of other sensors (such as when combination of movements/gestures are required to provide a trigger), and, based on these values/states, the controller may ignore the recognized gesture or may trigger a different scene or playing of an audio clip (e.g., navigate through a dialog tree), an animation such as provided by onboard robotics, and/or a special effect.

It was also recognized by the inventors that there are many applications where it is desirable to select or modify a base or neutral script of a show or a scene of a show to suit the visitors attending a show or interacting with a particular walk-around, costumed character. This may be labeled or thought of as context modulation of a pre-recorded show. With this in mind, the character control systems may include a context modulation assembly or system that allows an operator that may be supporting the performer wearing the costume to provide input to select the context of the interaction with a visitor or group of visitors/observers. When the context is selected, the controller may respond to this input by selecting the neutral set of pre-recorded audio clips from memory such as from a show database or more typically a context-specific (or context enhanced) set of pre-recorded audio clips providing a whole show or dialog for one or more scenes.

In this way, the character control system allows an in-room or on-set host (or other operator) to observe distinguishing features or characteristics of a visitor or show participant. Observed and identified features may then be communicated to the controller (e.g., a context modulator or context input processor run by the controller). The controller acts to shift the character's dialog to bias it towards pre-recordings that correlate to the host's input such as by choosing a context-specific set of dialog for a show, scene, or portions of show or scene for the character to suit a context selection communicated to the controller.

A character control system with context modulation can be adapted to leverage (or use) an inconspicuous device, e.g., a graphical user interface (GUI) provided via a small touch screen on a tablet, smart phone, or other handheld device configured for wireless communication, a prop, a toy, or an automated system. The device may be operated to display icons or buttons that can be selected (touched) by the operator/host to select one (or more) context among a plurality of such contexts for shifting or biasing dialog to suit features of a visitor(s). For example, the GUI may be configured or designed to allow the host or other operator working with the performer in the costume to surreptitiously select from an iconographic list (or use another input methodology) of visitor/participant characteristics such as birthday celebrant, costumed visitor (which may further allow selection between a number of types of costumes such as princess, pirate, character of a movie, and the like), a type of personality (e.g., shy visitor, rambunctious visitor), age group, and so on. In other cases, a prop or toy may be provided in the set to allow the host or other operator to modify or select a context suited for the present visitor/participant characteristics.

The selection is typically wirelessly transmitted to the controller (i.e., system responsible for dialog generation). The contextual selection/input does not directly trigger a new audio clip/utterance from the character's sound system or cause navigation along a dialog tree. Instead, the context modulator acts to process the input to select from a plurality of context-specific sets of pre-recorded scenes- or scripts so as to modify the overall context of the conversation between the visitor and the costumed performer. In an exemplary scenario or implementation, an in-room host (or photographer or other operator) may observe that a visitor to the room in which the costumed character performs is wearing a princess costume. The host may then use their handheld device with its context input GUI to communicate that observation to the controller, which uses its context modulator to select a princess-specific set of pre-recorded dialog from memory so as to provide a resulting conversation that is shifted or biased toward incorporating references to the visitor's "royal" status.

With this overview in mind, it may now be useful to discuss these control concepts in more detail with reference to the attached figures, which provide a system implementation and then proceed to discuss particular implementations of trigger mechanisms for control of walk-around characters (e.g., navigation of a dialog tree or triggering animation or special effects) and devices for providing context modulation of the presented dialog by the character.

FIG. 1 is a functional block diagram of a walk-around character control system 100 that includes a walk-around character costume 110 that may be worn by a performer/actor (not shown but will be understood to be activating the trigger mechanisms 120) to provide a show or interaction with visitor(s) 102 in a show room or on a set (indoors or outdoors) 104. The costume 110 may be used to represent a character from a movie or otherwise used to entertain visitors of a facility such as a theme park. The costume 110 is adapted to playback audio tracks, such as scripted lines of the voice of the character, and also to be articulated or animated, such as to have a moving mouth and blinking/moving eyes with such animation synchronized with the playing audio.

To this end, the costume 110 is shown to include robotics (or special effect mechanisms) 112 and a sound system 114 (both of which may be partially or wholly positioned inside a head or torso of the costume 110 in some embodiments) and an onboard and/or offboard controller/computer system 150 for providing control signals 128 (in a wired or wireless manner such as via optional digital communications network 108 with transceiver or wireless transmitter 118 used to receive such signals 128 and to transmit trigger signals 127 for processing by the show controller 150, as discussed below). The sound system 114 includes speakers 115 and is adapted for playing audio clips 117 to provide dialog for the costumed character, and the audio clips 117 may be stored in local memory 116 for later playback (e.g., in response to control signals 128) or may be buffered as received in signals 128 for playback by sound system 114 and its speakers 115.

As shown and as discussed above, the costume 110 includes one or more trigger mechanisms 120 that are configured to generate trigger signals 127 that are communicated to the show controller 150 for processing and to allow a performer to navigate through a recorded audio for a show. To this end, the show controller 150 is shown to include a processor 152 for executing code or instructions to perform functions described herein (e.g., to be a special purpose computing device allowing a performer to navigate dialog or otherwise control a walk-around costumed character). The CPU 152 runs input and output devices 154 such as a wireless transceiver for receiving the trigger signals 127 and context selection signals 136 and to transmit control signals 128 to the costume 110 to cause the sound system 114 to playback particular audio clips 117 and/or to operate robotics/special effect devices 112.

The controller processor 152 further manages (or has access to) memory or data storage 156. In memory 156, pre-recorded audio for a particular show(s) 170 is stored and can be selectively retrieved by the processor 152 for playback on sound system 114 of the costume 110. The audio 170 may be arranged or linked together via a dialog tree 172 that provides the logic for navigating through scenes 174 and/or audio clips (dialog/actor lines) 175 within each scene 174. In some embodiments, the context selection signal 136 is processed by a context modulator 190 (software program or module run by the processor 152) to select a scene 174 or audio clips 175 that are shifted or biased toward a particular context (e.g., a visitor 102 is having a birthday or is wearing a princess or pirate outfit as indicated by visitor-specific features 103).

The controller 150 includes a trigger processing module 160 (again, code or instructions executable by the processor 152 to cause the controller 150 to perform certain functions such as generating the control signals 128 to selectively navigate through a dialog tree 172 for a show 170). The trigger processing module 160 is configured to receive and process trigger signals 127 from the trigger mechanisms 120 to determine if a dialog navigation trigger has been initiated by the performer wearing the costume 110 (or if a trigger for robotics/effects 112 has been generated by the performed with trigger mechanism 120). If so, the trigger processing module 160 will determine how to navigate through the dialog tree 172 and provide this information via signals 128 to the costume 110 (e.g., to sound system 114 for playback of select audio clips 117). Navigation through pre-recorded audio (which may be arranged according to a dialog tree 170) may flow and be controlled in a number of ways, and several techniques for dialog navigation are explained in more detail in U.S. Pat. Appl. Publ. No. 2013/0226588, now U.S. Pat. No. 8,874,444, entitled "Simulated Conversation by Pre-Recorded Audio Navigator," which is incorporated herein by reference.

The trigger mechanisms 120 may include one or more pairs of spaced apart pressure sensors 122 such as on two different fingers (e.g., thumb and forefinger) of one or both of the gloves of the costume 110. Each of these sensors 122 may generate a pressure/force-indicative signal 127 that is transmitted by the transmitter 118 to the controller 150. Then, the trigger processing module 160 acts to determine a magnitude of pressure/force applied to each of the, for example, analog pressure sensors 122. The trigger processing module 160 may compare these values to pressure thresholds 180 stored in memory 156 to determine if the threshold has been met or exceeded.

Typically, false triggers are limited by the module 160 only recognizing or identifying a trigger action when both sensors 122 have concurrently sensed pressures/forces exceeding their matching or differing thresholds 180. For example, the trigger may be achieved by pressing the two sensors 122 together when they are positioned on different fingers of a glove of costume 110. The threshold values 180 may be set or adjusted to suit the particular performer as differing performers may be able to (or desire to) apply forces in differing ranges to activate a trigger with their fingers.

The trigger may also be associated with a particular response/action by the costume 110 or by the controller 150 (e.g., to navigate the dialog tree 172 of the recorded show audio 170), and these responses 188 may be stored in memory 156 for retrieval by the trigger processing module 160. For example, a trigger provided via a pair of sensors 122 in a left glove may cause forward (or backward) navigation in the dialog tree 172 while a trigger provided via a pair of sensors 122 in a right glove may cause backward (or forward) navigation in the dialog tree 172. In other cases, one pair of sensors 122 may be used for dialog navigation while another pair 122 is used to activate robotics/special effects 112. The particular response 188 taken by the controller 150 in response to a trigger is not limiting to the invention, as it is more important that control over the operation of the costume 110 and its components is provided to the performer (wearer of the costume 110) via a pair of pressure sensors 122 that can be concurrently activated (e.g., by the performer using two fingers to press the two sensors against each other in a fully or at least partially mating or abutting manner).

The trigger mechanisms 120 may also include one or more eye tracking sensors 124, which typically will be mounted within the head of the costume 124. The output from such sensors 124 are transmitted in signals 127 to the controller 150 for processing by the trigger processing module 160. As will be discussed below in more detail, the trigger processing module 160 (which may include an eye tracking subroutine) may process the signals 127 to determine an amount and direction of eye movement and, in some cases, whether the eye of the actor/performer wearing the costume 110 is open or closed (i.e., to track blinking as part of the eye tracking function). The module 160 may use these determined eye movements along with a set of predefined eye movement (or blinking) thresholds 182 to determine when a trigger has been received.

For example, the eye tracking sensor 124 may provide information 127 that the trigger processing module 160 identifies as looking to the left or the right to a degree or magnitude that exceeds a threshold 182 (moves the pupil outside a defined "normal" eye position range or the like). The controller 150 may respond to such a trigger identification by the module 160 to perform a particular response 188 such as to navigate through the dialog tree 172 in a predefined manner (e.g., but not as a limitation, left looking may trigger moving forward/backward in the tree 172 while right looking may trigger moving backward/forward in the tree 172 and up or down looking may trigger a special effect or navigate through the dialog tree 172).

The trigger mechanisms 120 may also include a gesture recognition sensor 126 that transmits signals 127 to the controller 150 for processing by the trigger processing module 160. In one implementation of the system 100, an accelerometer is used as the sensor 126, and it is positioned in or on the glove of the costume 110. Then, during a show, the performer may move their hand in a predefined manner, and this movement is sensed by the gesture recognition sensor 126. The trigger processing module 160 processes the signal 127 from the accelerometer or other sensor 126 and compares the identified movement or gesture with a set of predefined gestures 184 stored in memory 156. If the gesture that is identified matches one of the gestures 184, the controller 150 may retrieve a defined response 188 to the trigger and perform a particular function such as navigate through or jump within the dialog tree 172 to cause a scene 174 to start or cause an audio clip 175 to play ("Hello" or "Goodbye" for example if the performer is waving their hand or a similar gesture).

The character control system 100 may also be adapted to allow the audio provided by the sound system 114 to be contextually modulated to better suit a particular visitor(s) 102. To this end, the scenes 174 may be context-specific. In other words, the audio for the show 170 may include more than one set (or subset) of the audio clips 175 for at least some of the scenes 174, and each of these sets of audio clips 175 may be shifted or biased to a particular context such as a birthday, an anniversary, a visitor wearing a costume, a visitor's age and/or gender, and so on. A context modulator 190 is provided in the controller 150 to process context selection signals 136 from the show room/set 104 (i.e., from the input device 130) and, in response, to retrieve or queue up one of the context-specific scenes 174 (or set of audio clips or dialogs 175).

In practice, a context modulation operator 109 such as a host or photographer in the room or on the set 104 may observe one or more visitor-specific features 103 about a visitor 102 such as their age, whether they are celebrating a special occasion, and/or whether they are wearing a costume or clothes indicating they are fans of a show, a character, and the like. The operator 109 may then use or operate a context input device 130 to generate the context selection signal 136. The device 130 may be nearly any wired or wireless communication device useful for generating the signal 136 and receiving user input from the operator 109. For example, the device 130 may be a tablet or handheld device (e.g., a smartphone or the like) with input and output devices 132 such as a touchscreen or monitor. In the illustrated embodiment, the I/O devices 132 are used to generate and display a graphical user interface (GUI) 134 configured, such as with an iconographic listing, to facilitate context selection by the operator 109.

In other cases, though, a GUI 134 may not be utilized to modulate context with signals 136, and these cases may use a prop, a toy, or an automated system to allow a host or operator to select and/or initiate the signals 136. The contexts may be associated with icons indicative of a neutral/base context and a plurality of non-neutral contexts such as a birthday celebrant or a young child in one or more predefined costumes (e.g., a pirate, a prince/princess, and so on) or the contexts may be associated with a particular prop or toy "operated" by the host or operator (or an automated system may provide the context modulation in some cases). The context modulation may be done by a host or by nearly any other person involved in the entertainment such as a performer or may be performed by an automated system (not shown in FIG. 1 but understood by those skilled in the art). Further, the "context modulation" is not limited to selection of or modulation of which audio clips are utilized in the system 100. In some cases, the timing of show elements (including audio clips, special effects, the like) may be modulated as may be other show or output parameters such as amplitude (or volume), frequency, and the like may be modulated or changed by the context input device 130 (which, again, may be GUI based or may be achieved in other manners such as use of props, toys, or automated systems). In some cases, context modulation may be used to control synthesis of a script or to combine one or more special effects. Further, an operator of the context input device 130 may choose two or more contexts for concurrent implementation to achieve a desired show context provided to a visitor/participant (e.g., select both "birthday" and "shy" to have birthday lines/audio clips and/or special effects for a shy child and so on).

Figure 2:
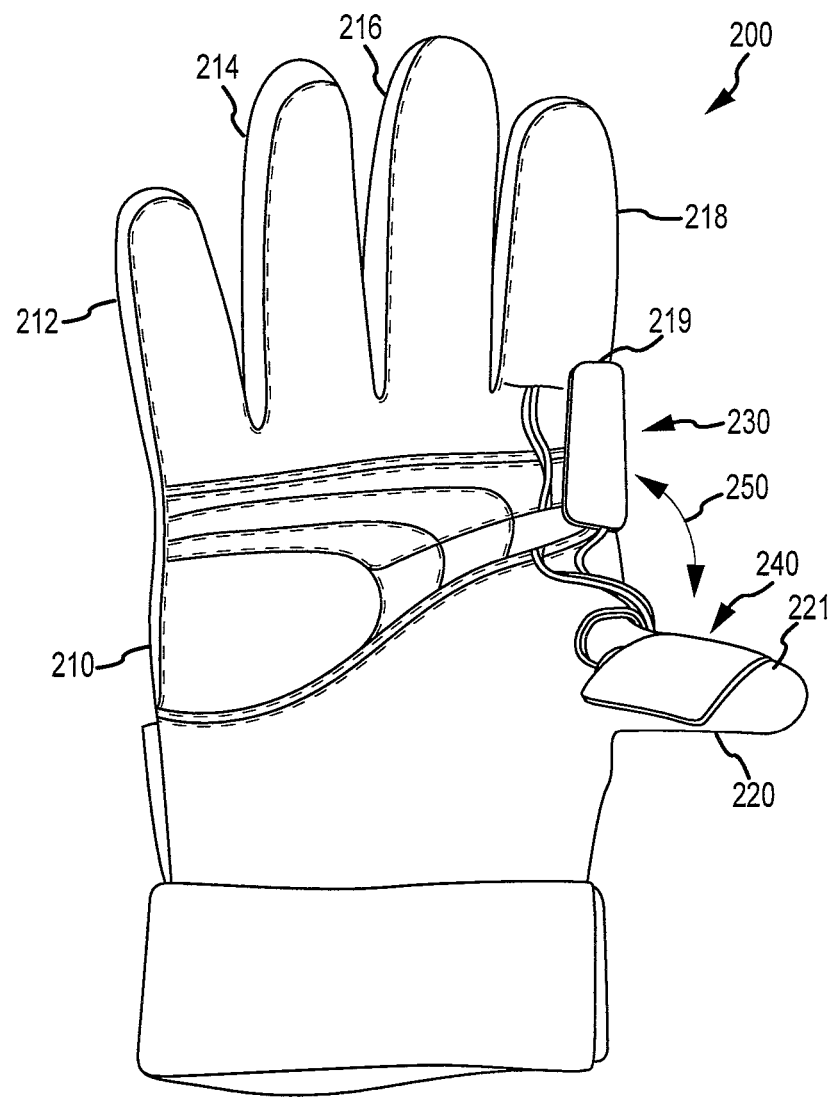
FIG. 2 illustrates an exemplary costume glove with a pair of pressure sensors that may be used to allow a performer/ wearer of a costume (such as the costume of FIG. 1) to selectively trigger control of the costumed character such as to navigate through a dialog tree of a pre-recorded and scripted show.

With regard to implementing a pair of pressure sensors for a trigger mechanism 122, FIG. 2 illustrates an exemplary costume glove 200 that may be used to allow a performer/wearer of a costume (such as costume 110) to selectively trigger control of the costumed character such as to navigate through a dialog tree. As shown, the costume glove 200, which may be a right or left-handed glove with a right-handed glove shown in FIG. 2, includes a main portion or body 210 that would fit over a performer's palm and cover the back of their hand. The glove 200 also includes four fingers 212, 214, 216, and 218 that are adapted (sized and shaped) to cover all or portions of a performer's four fingers. The glove 200 further includes a thumb 220 for receiving the performer's thumb.

In the glove 220, a trigger mechanism is provided by providing a first analog pressure sensor 230 on (or in) the outer surface 219 (or the thumb-facing portion) of the glove's index or fore finger 218 and by providing a second analog pressure sensor 240 on the inner surface or pad 221 of the glove thumb 220. To use these two or paired sensors 230, 240 as a trigger mechanism, the operator places the glove 200 on their hand and then moves finger 218 and thumb 220 together as shown with arrow 250 such that the two sensors 230 and 240 apply pressure to each other. When the pressure exceeds a preset threshold value for each sensor (the threshold may be the same or may differ for each sensor) 230, 240, a triggering event or state is identified, and a controller may respond with a predefined response such as by navigating forward or backward within a dialog tree. By pressing the two sensors 230, 240 together, the pair is concurrently activated by the operator.

The forefinger sensor 230 may be placed toward or on the base of the finger 218 as shown or may be located closer to the tip of the finger 218. By placing the sensors 230, 240 on the pad or inner surface 221 of the thumb 220 and on the outer surface 219 of the forefinger 218, a person wearing the glove 200 can readily place 250 the two sensors 230, 240 in abutting contact and apply pressure in an ergonomically acceptable manner, but there is relatively little chance for a false triggering because these two portions of the glove 200 typically are not concurrently contacted during normal activities such as when the person wearing the glove 200 shakes someone's hand or grasps an object (both activities may cause one sensor to sense a pressure over the threshold but not both concurrently as required for trigger processing module to identify a triggering state/event).

Figure 3:
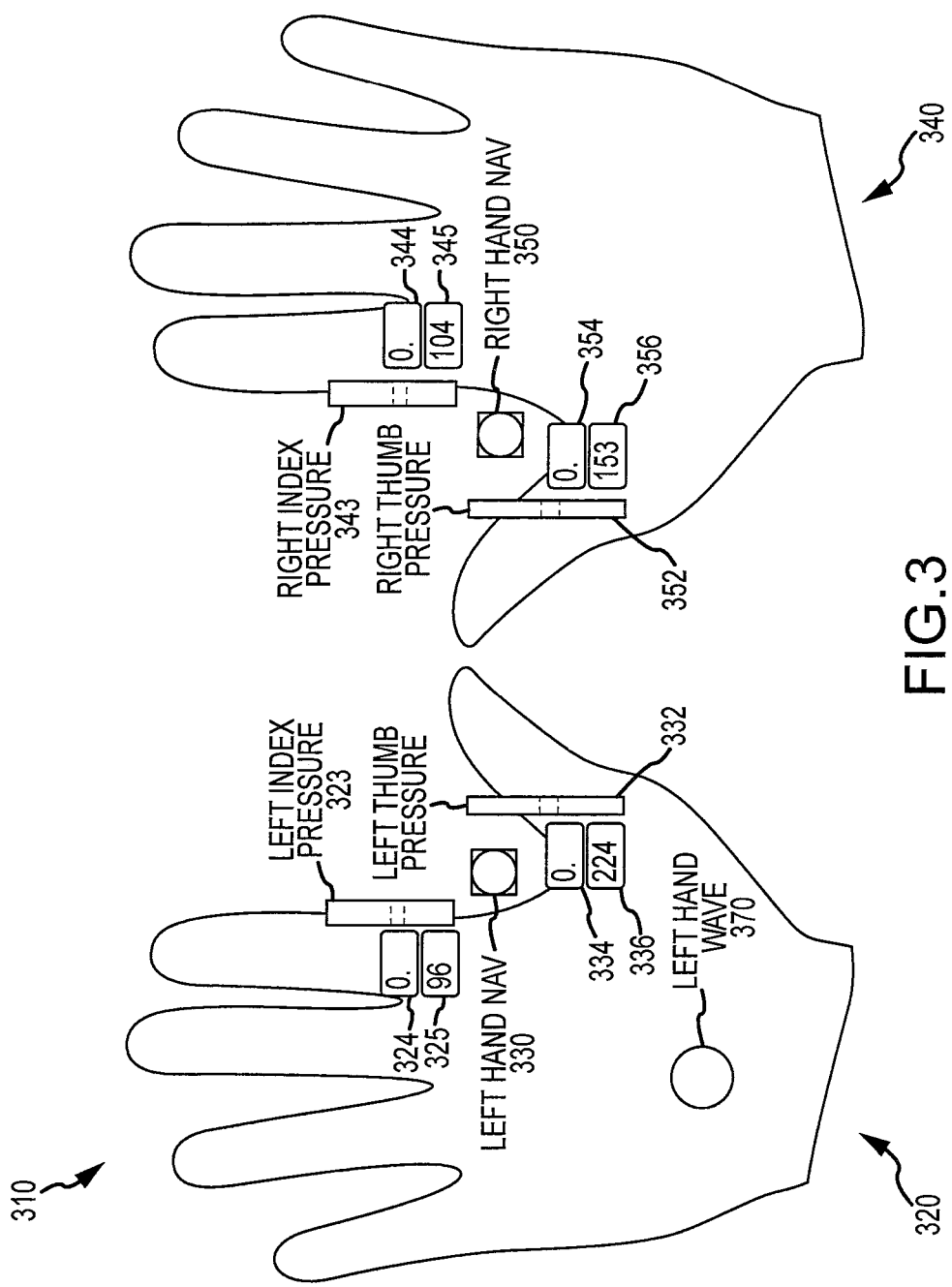
FIG. 3 is a user interface that may be provided on a monitor/screen of a show controller to present states of trigger mechanisms provided in gloves of a costume such as the glove of FIG. 2.

FIG. 3 illustrates a screen shot of a GUI 310 that may be generated and provided in a monitor in a character control system, such as one of the I/O devices 154 of the controller 150 in system 100. The GUI 310 is useful in practice for presenting measured sensor values of trigger mechanisms provided in a costume glove and also for explaining the operation of a character control system of the present description.

The GUI 310 displays a left hand image or left glove 320 side-by-side with a right hand image or right glove 340. The left glove 320 is shown to include a pair of pressure sensors 330 in the form of a left index trigger and a left thumb trigger, and this pair of sensors 330 provides a left hand trigger mechanism for navigation of a dialog tree or triggering other controlled functions for a walk-around character costume. Similarly, the right glove 340 is shown to include a pair of pressure sensors 350 in the form of a right index trigger and a right thumb trigger, and this second pair of sensors 350 provides a right hand trigger mechanism for navigation of a dialog tree or other triggered controls. As discussed above with reference to FIG. 2, a first half of the pairs of pressure sensors 330, 350 typically would be provided on the outer surface of the index fingers of the gloves while the second half of the pairs of pressure sensors 330, 350 typically would be positioned on the inner or pad surface of the thumbs of the costume gloves. This allows a performer wearing the gloves to easily press the two sensors of each pair 330, 350 together while limiting risks of both being inadvertently activated at the same time.

The GUI 310 is configured to indicate present operational states of the glove-based trigger mechanisms. To this end, a slider bar 323, 332, 343, 352 is provided for each of the sensors in the two pairs 330, 350 with an indicator element showing a trigger threshold for each sensor along with a present pressure reading. At the illustrated operating time for GUI 310 in FIG. 3, display boxes 324, 334, 344, 354 are used to show the current pressure readings, with each being zero (e.g., the sensors of pairs 330, 350 are not being pressed together or against other objects). The GUI 310 also includes display boxes 325, 336, 345, 356 showing in a numerical manner the threshold setting for each sensor in the pressure sensor pairs 330, 350.

As shown, each of the threshold valued differ from each other as the trigger mechanisms can be tuned to a particular operator, and the amount of pressure required to trigger any particular sensor can be equal or, more typically, will differ to facilitate use by a wide range of performers. For example, it may be easier to apply pressure to a thumb sensor than an index finger sensor, and the performer may apply more pressure with their "strong" hand (are they right or left handed, for example), and differing threshold values can be set and stored in memory for each sensor to tune the character gloves and their sensors to the performer. In other cases, though, each of the threshold values is set to be equal and at a low enough value to allow each performer in a pool to easily trigger the pressure sensors without undue false triggering.

False triggering is further controlled by requiring that both sensors in a sensor pair be triggered (have a pressure over a threshold) concurrently prior to a control signal such as a dialog navigation signal/action being generated by a show controller. For example, an actor may shake a visitor's hand with their right hand, and this may cause pressure shown at 344 and at 343 to be applied to the right index finger sensor of sensor pair 350 that exceeds a threshold shown at 345. However, a triggering state or event is not identified by the trigger processing module because the thumb pressure sensor in the right hand pair 350 was not concurrently triggered with a pressure 352, 354 exceeding its threshold value 356. In contrast, while shaking the visitor's hand, the performer may move their left thumb and index finger together to trigger dialog, and the trigger processing module may act to determine that the left index pressure sensor and left thumb pressure sensor of left hand pressure sensor pair 330 have current pressures 323, 324, 332, 334 that both concurrently exceed the preset threshold values 325, 336. In response, a control signal may be generated to navigate through a dialog tree (e.g., have the character say "Hello" or "Goodbye" while shaking hands, in this example). In some embodiments, a time threshold may also be applied to allow triggering of control signal/action. For example, the trigger processing module may detect that both sensors of a pair (index finger and thumb sensor) 330 or 350 have exceeded their respective thresholds, but a trigger may not be identified unless the thresholds are exceeded for a preset period of time (e.g., actor has to press and hold (e.g., for 1 to 3 seconds or the like) their fingers together to generate a trigger).

To provide this type of control with "thumb switching" that is achieved with one simple movement of pressing thumb against fore finger, a variety of sensors and sensing devices may be used for a trigger mechanism. In some embodiments, two analog pressure sensors are used with one provided in the pad of the thumb in a glove with the other in a thumb-facing portion of a glove finger such as the index finger. In another embodiment, a magnet and a Hall Effect sensor are paired (in place of the two analog sensors) to detect when the fingers of a glove are touched together or placed in close proximity. In yet another embodiment, a capacitive sensor pair is utilized as the pressure sensor pair/trigger mechanism. In this case, the capacitive sensors have to be positioned in close proximity to each other to affect the capacitance, and the change in capacitance is sensed and used to identify a triggering event/state.

The GUI 310 further shows that an additional trigger mechanism may be provided on one or both of the costume gloves 320, 340. Particularly, a symbol or image 370 is shown on in the main part or body of the left glove 320 that is intended to represent a gesture recognition sensor such as an accelerometer. The sensor represented by symbol/image 370 functions to transmit signals to the trigger processing module, and as shown in GUI 310, the present state may be a left hand wave. This may result in a special effect or other event (such as jumping to a particular line of dialog or piece of dialog within a scene that is triggered when a gesture is detected).

As discussed above, accuracy over control and detection of gestures may be enhanced by the trigger processing module only allowing each gesture-based trigger to be provided at certain times in a show such as within a particular scene or a limited time within a scene (e.g., only allow waving gesture to trigger "Hello" or other welcoming dialog during initial phases of a greet/welcome scene). In other cases, though, some gestures may always be allowed to trigger control (such as dialog tree navigation) when they are detected. This may be useful for gestures that are typically not mistakenly or accidently made by the actor/performer such as downward first movement (to trigger an "Oh, Boy!" or other dialog matched to that gesture in any scene or throughout the show).

In some preferred embodiments, two triggering states have to be identified to cause a trigger processing module to trigger a control signal/action. For example, two gestures (a left and a right hand gesture) may have to be recognized to generate a trigger or a gesture-based trigger may be provided concurrently with or within a predefined time period before or after a pressure sensor-based trigger is identified. Such combination of data to cause a trigger can be useful to limit false triggers and also to increase the number of triggers that may be used to control operation of a walk-around costumed character.

Figure 4:
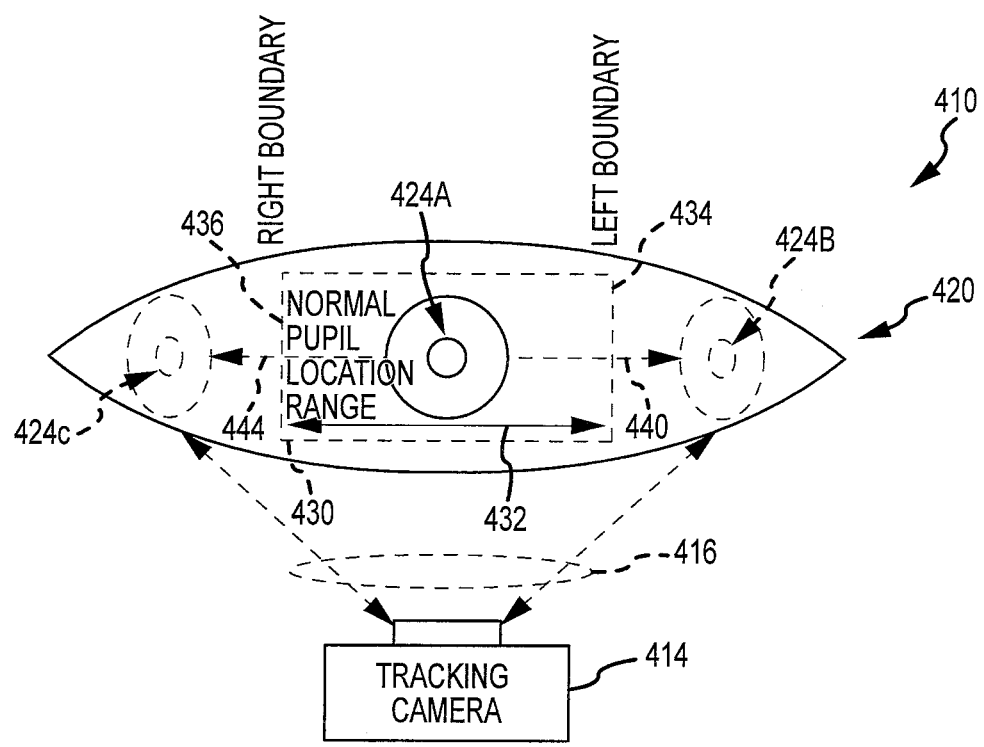
FIG. 4 illustrates a portion of an eye tracking sensor assembly that may be used to allow a wearer of a costume head to selectively move their eye(s) to trigger control over the character costume and its equipment such as to navigate through dialog or initiate a special effect.

The triggering mechanism as shown at 124 in FIG. 1, may take the form of an eye tracking sensor. FIG. 4 illustrates a portion of an eye tracking sensor assembly 410 that may be used within a head of a costume to track movement of an eye of a performer to allow the performer to trigger control over the costume's components such as to navigate through a dialog tree. A tracking camera 414 is provided to receive light 416 from the performer's eye 420 to track movement of the performer's pupil 424A-424C. For example, the camera 414 may be mounted in a head of a costume and positioned so as to be focused upon one of the performer's eyes when they wear the head. Pupil tracking technology that is readily available (off-the-shelf equipment as used for market research and the like) may be used for the camera 414 with the software (trigger processing module of FIG. 1) modified to provide the functionality/tracking of triggers as described herein.

The eye tracking or trigger processing module may be configured particularly to prevent or reduce the number of false triggers detected when using eye or pupil tracking. It was recognized that most performers will turn their head to cause the character/costume head to turn when they need to see or look to their left and right, and the performers typically will not simply move their eyes/pupils to the left and right during the normal course of performing with a headed costume. Hence, the trigger processing module may be adapted to process outputs of the tracking camera 420 to determine whether the performer's pupil is within a normal/expected pupil location range 430 (which is a predefined range of movement 432 of the pupil 424A that is anticipated when the actor is simply trying to look out the eyes of the character and may include an amount of involuntary or unconscious eye movement). No trigger is identified or generated when the movement 432 is within (or not outside) the range 430 defined by left and right pupil movement boundaries 434, 436.

However, the trigger processing module (pupil tracking software) may determine that the performer has moved their eye 420 such that their pupil 424B has moved 440 to the left outside or over the left boundary 434 or their pupil 424C has moved 444 to the right outside or over the right boundary 436. In either of these events, the trigger processing module may identify a trigger involving left eye movement or right eye movement, and the show controller may act to perform a defined response to one of these two identified triggers. For example, left pupil movement 440 may trigger backward (or forward) movement through a dialog tree while right pupil movement 444 may trigger another action such as forward (or backward) movement through the dialog tree. While not shown, the pupil tracking may also (or alternatively) involve identifying up or down looking that is outside the normal range 430. In other words, pupil tracking may be performed such that any movement out of a predefined normal range (which may be defined by testing for each performer) is identified as a trigger.

The trigger processing module may be programmed to further process incoming information from the tracking camera to limit (or eliminate) false triggers. For example, instead of a simple one time movement out of the normal range, a trigger may not be identified unless the performer holds the out of range pupil movement 440 or 444 for a threshold period of time (e.g., hold pupil as shown at 424B or 424C for 1 to 2 seconds or the like). In other cases, the trigger may be detected or identified when two movements are identified such as two looks 440, 444 to the left or right or a look/movement 440 to the left followed by a look/movement 444 to the right (or vice versa). Typically, the two eye movements have to occur within a predefined time period to be considered as a pair of triggering eye movement (such as by requiring that the second movement be received within 1 to 5 seconds from the first movement). Such two-movement triggers can be thought of as being a "double click" to trigger similar to double clicking with a mouse to cause an action in a GUI/interface or software application that will feel natural to many performers even though the actions are being performed with eye movement.

The pupil tracking with camera 414 may also provide data that can be used by the trigger processing module to determine when the performer blinks their eyes. Such identification can be used to trigger blinking of the eyes of the character such as by the controller triggering with control signals operation of robotics to cause the eyes on the costume head to blink. In other cases, the performer may close and hold their eyes closed to trigger dialog navigation, special effects, or to request an emergency exit from the ongoing scene or show.

Further, the pupil (or eye) tracking may be performed with other technologies rather than relying on the tracking camera 414. For example, the eye tracking sensor 124 of FIG. 1 may be implemented using electrooculography, which is a process for measuring (such as with three sensors places proximate to the performer's eye on their face) changes in polarity (or potential) of their eye. Processing of such changes in polarity or potential can be used to track eye movements. For example, if the eye is moved from the center position toward one electrode/sensor, this electrode/sensor "sees" the positive side of the retina and opposite electrode/sensor "sees" the negative side of the retina. Hence, a potential difference occurs between the electrodes/sensors, and the determined/recorded potential is a measure for the present eye position. The trigger processing module may be adapted to use electrooculography to determine eye movement and determine when the movement triggers a predefined response (within the normal range or out of range left, right, up, or down and using the controller to generate a control signal corresponding to a particular trigger).

As shown in FIG. 1, the character control system 100 may include a context modulator 190 in the show controller 150 that processes input/data signals from a context input device 130 operable by a host, photographer, or other operator 109 to provide visitor-specific features or context (for visitor 102). Further, the context modulator 190 may shift or bias the dialog based on the inputted context or visitor features such as selecting and queuing up scenes or dialog that is context specific as shown at 174 in recorded audio for a show 170. Additionally, the context provided by a host or other operator may be used to provide special show effects or animation of the walk-around character costume. By using a context input device 130, a host or other operator is able to replace a backstage operator and is more effectively able to obtain context information for a show or scene from a visitor they are greeting and working with on the set or in the show room.

For example, context modulation may be provided by a meet and greet host operating the context input device 130. The host (e.g., host 109 in FIG. 1) is in the room with a walk-around costumed character. The host may observe characteristics or features 103 about the visitor or guest, and the host can readily trigger or select context for the visitor or group of visitors to personalize the show/scene to their interests and characteristics. The input device 130 may provide tactile feedback to alert the host/operator 109 to enter context information such as by vibrating when a new visitor/group 102 enters the show room/set 104.

A context selection GUI 134 may then be provided on the touchscreen 132 of the input device 130, and the host 109 may select one or more icons or buttons to provide data on context or visitor-specific features 103 of visitor/group 102. A key aspect is that this allows the context of a show/scene to be changed at the beginning of the show or at one or more points within a show such as context modulation for one or more scenes (subsets of the dialog may be context-specific while others may be neutral to be provided to all and the context selection may occur any time prior to a scene starting point or even during a scene in some cases).

Figure 5:
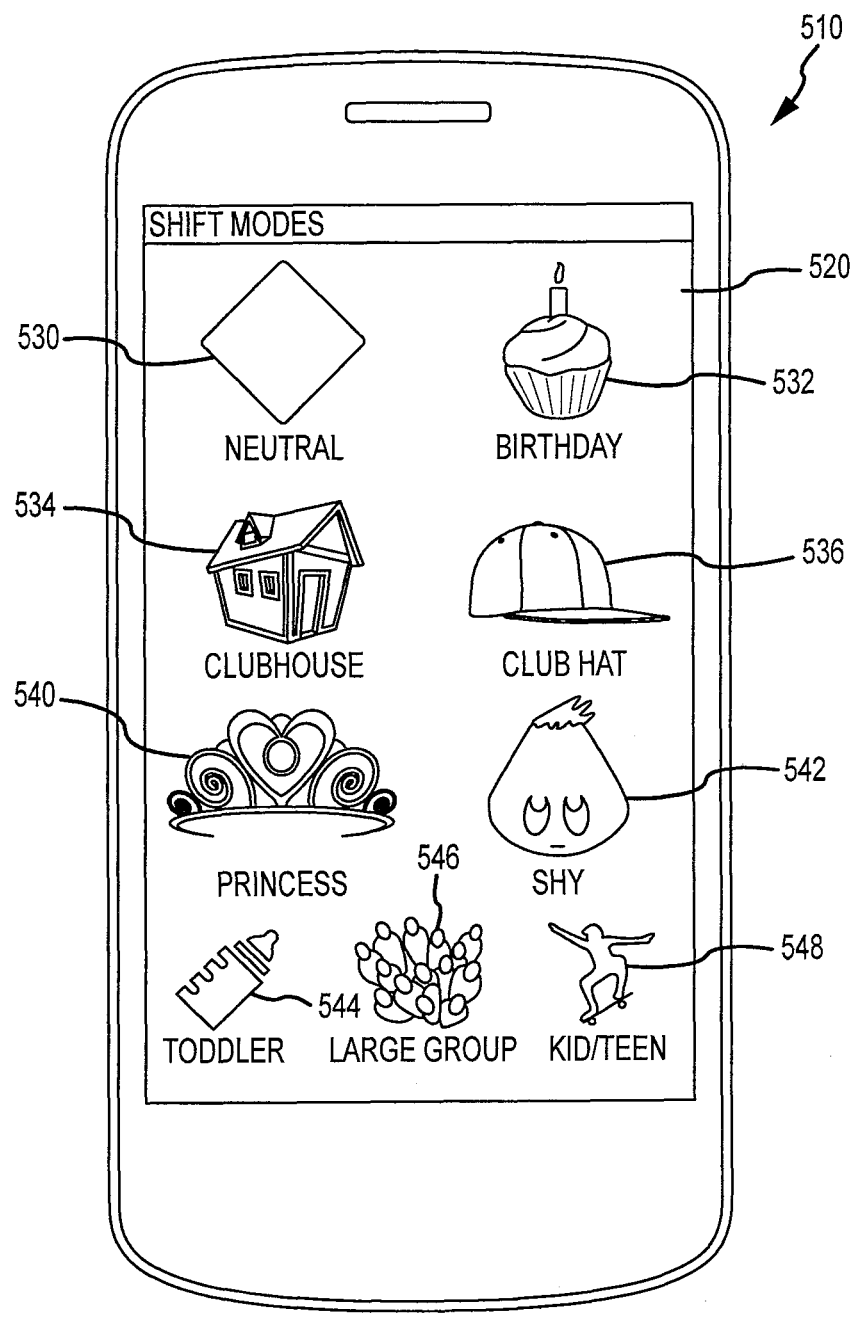
FIG. 5 shows an handheld context input device during operation to show one set of icons/buttons that may be provided on a touchscreen to facilitate selection of context by host, photographer, or other operator.

FIG. 5 illustrates an exemplary context input device 510 in the form of a smartphone or similar handheld device or tablet/pad. The context input device 510 includes a touchscreen 520 for allowing a user to provide context selections, but other devices 510 may include keyboards, voice recognition, or other technologies for allowing a user such as a host or photographer to make a context selection. The device 510 is configured to provide wireless communication of the context selections or inputs to a remote controller (or a controller in the costume) for processing by a context modulator to select context-specific scenes Or dialog.

In FIG. 5, a screen shot is provided of the device 510 operating to provide a context input GUI in its touchscreen 520. In this example, an iconographic listing is provided of selectable contexts (or visitor-specific features/characteristics) that may be chosen by an operator of the device 510. The iconographic listing is shown to include nine icons representing nine different contexts. This set of contexts (or context icons) includes a neutral context 530, which may also be a default context, and the dialog that is neutral may be shifted or biased to be appropriate to a variety of visitors such as the non-native language speaking visitors and other groups for which it may be desirable to keep the dialog relatively simple and non-complex (without very many colloquialisms unless they are expected for a particular character). The listing also includes a birthday icon 532, and, as expected, the context-specific scene selected when the icon 532 is chosen will typically be shifted toward celebration of a birthday.

The listing further includes a clubhouse or club member 534, which may be selected when the visitor is identified by the operator of the device 510 to be a member of a fan club or the like recognizable within the show or a scene of the show. In some cases, the visitor may be wearing clothes such as a pin or a hat that indicates their interests or a context for which they would like a show to be provided, and the host may select the club hat (clothing item) icon 536 to shift the context of the dialog (or show elements) based on the clothing article. Similarly, the visitor may be wearing a costume or other indicator that they are very interested in a particular subject matter such as wearing a princess costume or a tiara to show they are pretending to be a princess. The icon 540 may be selected to cause the context modulator to shift dialog toward a princess-based show/scene. More icons may be provided to allow other similar contexts such as a pirate outfit, a spaceman, an athlete, and so on.

The context selected to suit a visitor may also be based on their personality or how it appears they will interact with the character. To this end, the context icon 542 may be selected with the example in the GUI of FIG. 5 allowing a host/operator to indicate the visitor may be shy, and the dialog may be shifted or biased to account for this visitor characteristic. In other cases, the personality shift/context may be toward outgoing or boisterous for a highly energetic and interactive visitor (or another personality or interactive characteristic). The context may also be chosen based on the age of the visitor such as by indicating the visitor is very young with toddler icon 544 or with kid/teenager icon 548. Similar icons may be provided to indicate the gender of the visitor. In other cases, the host/operator of device 510 may select icon 546 to shift the dialog/scene from a single visitor to a larger group of visitors. The number and types of contexts are nearly limitless, and the contexts described here intended to be just a simple example of how context selection may be used to trigger dialog tree navigation within pre-recorded audio for a show provided by a walk-around costumed character.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A control system for selectively operating a sound system provided in a walk-around character costume, comprising:

a trigger mechanism provided in the walk-around character costume, the trigger mechanism being operable by a performer wearing the walk-around character costume to generate and transmit at least one trigger signal;

a controller receiving the trigger signal and, in response, transmitting a control signal causing the sound system to playback a set of pre-recorded dialog; and a trigger processing module run by the controller for processing the trigger signal and, in response, to navigate pre-recorded audio for a show to select the set of pre-recorded dialog, wherein the trigger mechanism comprises a first and a second pressure sensor spaced apart in the walk-around character costume and wherein the processing of the at least one trigger signal by the trigger processing module comprises comparing a first pressure sensed by the first pressure sensor to a first threshold and comparing a second pressure sensed by the second pressure sensor to a second threshold, and wherein the control signal is generated when the first and second thresholds are concurrently exceeded.

2. The control system of claim 1, wherein the first threshold differs from the second threshold.

3. The control system of claim 1, wherein the first pressure sensor is positioned in a glove of the walk-around character costume in a pad of the thumb of the glove and wherein the second pressure sensor is positioned in a finger of the glove.

4. The control system of claim 1, wherein the trigger mechanism comprises a gesture recognition sensor mounted on the walk-around character costume.

5. The control system of claim 4, wherein the processing of the trigger signal by the trigger processing module comprises identifying a gesture and performing the navigating of the pre-recorded audio for the show based on the identified gesture and based on when the identified gesture is received during performance of the show.

6. The control system of claim 1, further comprising a context modulator receiving a context selection signal and, in response, selecting at least a portion of the pre-recorded audio for the show, whereby the set of pre-recorded dialog is context-specific.

7. The control system of claim 6, wherein the context selection signal is generated by a context input device operable by an operator and wherein the context input device is positioned in a room or on a set with the performer wearing the walk-around character costume.

8. The control system of claim 7, wherein the context input device is adapted to display a graphical user interface with an iconographic list of context icons that are each selectable by the operator via the graphical user interface and are each associated with a differing context.

9. A control system for selectively operating a sound system provided in a walk-around character costume, comprising:

a trigger mechanism provided in the walk-around character costume, the trigger mechanism being operable by a performer wearing the walk-around character costume to generate and transmit at least one trigger signal;

a controller receiving the trigger signal and, in response, transmitting a control signal causing the sound system to playback a set of pre-recorded dialog; and a trigger processing module run by the controller for processing the trigger signal and, in response, to navigate pre-recorded audio for a show to select the set of pre-recorded dialog, wherein the trigger mechanism comprises an eye tracking sensor and the at least one trigger signal is processed by the trigger processing module to identify pupil movement of the performer exceeding a predefined threshold or to identify blinking of an eye by the performer, wherein the trigger mechanism further comprises a first and a second pressure sensor spaced apart in the walk-around character costume, and wherein the processing of the at least one trigger signal by the trigger processing module comprises comparing a first pressure sensed by the first pressure sensor to a first pressure threshold and comparing a second pressure sensed by the second pressure sensor to a second pressure threshold, and wherein the control signal is generated when the first and second pressure thresholds are concurrently exceeded.

10. The control system of claim 9, wherein the pupil movement initiates the control signal when the identified pupil movement is outside of a normal pupil location range.

11. The control system of claim 10, wherein the control signal is initiated when the identified pupil movement is outside of the normal pupil location range at least twice within a preset time period.

12. The control system of claim 9, wherein the trigger mechanism comprises a gesture recognition sensor mounted on the walk-around character costume.

13. The control system of claim 12, wherein the processing of the trigger signal by the trigger processing module comprises identifying a gesture and performing the navigating of the pre-recorded audio for the show based on the identified gesture and based on when the identified gesture is received during performance of the show.

14. The control system of claim 9, further comprising a context modulator receiving a context selection signal and, in response, selecting at least a portion of the pre-recorded audio for the show, whereby the set of pre-recorded dialog is context-specific.

15. The control system of claim 14, wherein the context selection signal is generated by a context input device operable by an operator and wherein the context input device is positioned in a room or on a set with the performer wearing the walk-around character costume.

16. The control system of claim 15, wherein the context input device is adapted to display a graphical user interface with an iconographic list of context icons that are each selectable by the operator via the graphical user interface and are each associated with a differing context.

17. A control system for selectively operating a sound system provided in a walk-around character costume, comprising:

a trigger mechanism provided in the walk-around character costume, the trigger mechanism being operable by a performer wearing the walk-around character costume to generate and transmit at least one trigger signal;

a controller receiving the trigger signal and, in response, transmitting a control signal causing the sound system to playback a set of pre-recorded dialog; and a trigger processing module run by the controller for processing the trigger signal and, in response, to navigate pre-recorded audio for a show to select the set of pre-recorded dialog, wherein the trigger mechanism comprises a gesture recognition sensor mounted on the walk-around character costume, wherein the processing of the trigger signal by the trigger processing module comprises identifying a gesture and performing the navigating of the pre-recorded audio for the show based on the identified gesture and based on when the identified gesture is received during performance of the show, wherein the trigger mechanism comprises a first and a second pressure sensor spaced apart in the walk-around character costume, wherein the processing of the at least one trigger signal by the trigger processing module comprises comparing a first pressure sensed by the first pressure sensor to a first threshold and comparing a second pressure sensed by the second pressure sensor to a second threshold, and wherein the control signal is generated when the first and second thresholds are concurrently exceeded.

18. The control system of claim 17, wherein the first threshold differs from the second threshold.

19. The control system of claim 17, wherein the first pressure sensor is positioned in a glove of the walk-around character costume in a pad of the thumb of the glove and wherein the second pressure sensor is positioned in a finger of the glove.

20. The control system of claim 17, wherein the trigger mechanism comprises an eye tracking sensor and the at least one trigger signal is processed by the trigger processing module to identify pupil movement of the performer exceeding a predefined threshold or to identify blinking of an eye by the performer.

21. The control system of claim 20, wherein the pupil movement initiates the control signal when the identified pupil movement is outside of a normal pupil location range.

22. The control system of claim 21, wherein the control signal is initiated when the identified pupil movement is outside of the normal pupil location range at least twice within a preset time period.

23. The control system of claim 17, further comprising a context modulator receiving a context selection signal and, in response, selecting at least a portion of the pre-recorded audio for the show, whereby the set of pre-recorded dialog is context-specific.

24. The control system of claim 23, wherein the context selection signal is generated by a context input device operable by an operator and wherein the context input device is positioned in a room or on a set with the performer wearing the walk-around character costume.

25. The control system of claim 24, wherein the context input device is adapted to display a graphical user interface with an iconographic list of context icons that are each selectable by the operator via the graphical user interface and are each associated with a differing context.

* * * * *